(12) United States Patent
Ananthanarayanan et al.

(10) Patent No.: US 10,942,731 B2
(45) Date of Patent: Mar. 9, 2021

(54) SCALABLE CODE REPOSITORY WITH GREEN MASTER

(71) Applicant: Uber Technologies, Inc., San Francisco, CA (US)

(72) Inventors: Sundaram Ananthanarayanan, San Francisco, CA (US); Masoud Saeida Ardekani, Milpitas, CA (US); Denis Haenikel, Los Altos, CA (US); Balaji Varadarajan, San Jose, CA (US); Simon Santiago Soriano-Perez, Amsterdam (NL); Dhaval Patel, Fremont, CA (US); Ali-Reza Adl-Tabatabai, San Jose, CA (US)

(73) Assignee: Uber Technologies, Inc., San Francisco, CA (US)

( * ) Notice: Subject to any disclaimer, the term of this patent is extended or adjusted under 35 U.S.C. 154(b) by 10 days.

(21) Appl. No.: 16/390,612

(22) Filed: Apr. 22, 2019

(65) Prior Publication Data
US 2020/0192660 A1    Jun. 18, 2020

Related U.S. Application Data

(60) Provisional application No. 62/781,581, filed on Dec. 18, 2018.

(51) Int. Cl.
*G06F 8/71* (2018.01)
*G06F 16/901* (2019.01)
*G06F 17/18* (2006.01)

(52) U.S. Cl.
CPC ............ *G06F 8/71* (2013.01); *G06F 16/9027* (2019.01); *G06F 17/18* (2013.01)

(58) Field of Classification Search
None
See application file for complete search history.

(56) References Cited

U.S. PATENT DOCUMENTS 7,648,070 B2 *  1/2010  Droms ............... H04L 41/0806
                                                       235/451
9,064,164 B2 *  6/2015  Jett ..................... G06K 7/10366
(Continued)

FOREIGN PATENT DOCUMENTS

CA    2889387 A1 *  5/2013  .......... G06F 11/3688
EP    2109040 A2 *  4/2009  .............. G06F 9/44
(Continued)

OTHER PUBLICATIONS

Developer Community, "Get help from our community supported forum", 2018, https://developercommunity.visualstudio.com/idea/355793/add-option-to-stop-projects-building-if-their-depe.html (Year: 2018).*

(Continued)

*Primary Examiner* — Hossain M Morshed
(74) *Attorney, Agent, or Firm* — Fenwick & West LLP

(57) ABSTRACT

A green master is maintained in a code repository. A code management system receives changes to the code and maintains an ordered revision queue. A hierarchical set of builds is defined with each build corresponding to a code change. A model is applied to determine a value for each build, with the value being based on the probability that the build will ultimately be used. A build schedule is determined based on the values for the builds and at least some of the builds are implemented to determine whether committing the corresponding code changes keep the master green or not. Code changes that keep master green are committed to the code repository.

20 Claims, 5 Drawing Sheets

(56) References Cited

U.S. PATENT DOCUMENTS

| | | | |
|---|---|---|---|
| 10,127,143 B2* | 11/2018 | Hamilton, II | G06F 11/3684 |
| 2006/0005174 A1* | 1/2006 | Feigenbaum | G06F 9/451 |
| | | | 717/143 |
| 2017/0329699 A1* | 11/2017 | Adinarayan | G06F 11/368 |
| 2018/0074936 A1* | 3/2018 | Broadbent | G06F 11/36 |
| 2019/0155722 A1* | 5/2019 | Gupta | G06F 11/008 |
| 2020/0004849 A1* | 1/2020 | Baker | G06F 9/44505 |
| 2020/0065078 A1* | 2/2020 | Bregman | G06F 8/60 |
| 2020/0192660 A1* | 6/2020 | Ananthanarayanan | |
| | | | G06F 17/18 |

FOREIGN PATENT DOCUMENTS

| | | | | |
|---|---|---|---|---|
| EP | 2109040 A2 * | 10/2009 | | |
| WO | WO2013078269 A9 * | 5/2013 | | G09F 9/44 |

OTHER PUBLICATIONS

Dev-Community, "Add option to stop projects building if their dependencies fail to build", Oct. 2018, Developer Community (Year: 2018).*

* cited by examiner

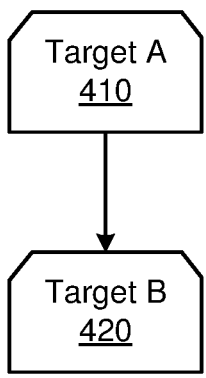
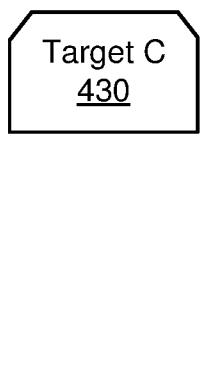
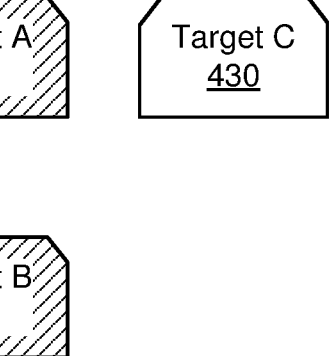
FIG. 4A
FIG. 4B
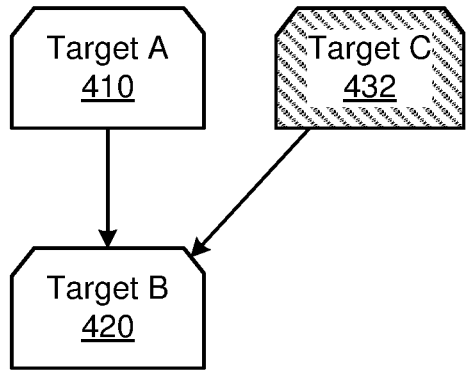
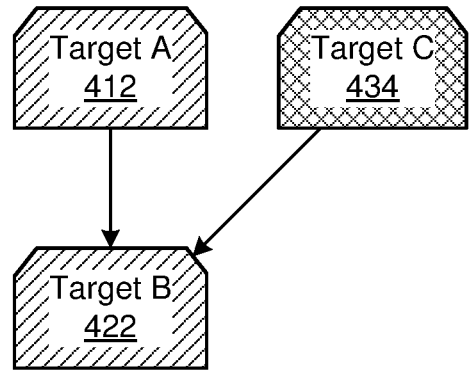
FIG. 4C
FIG. 4D
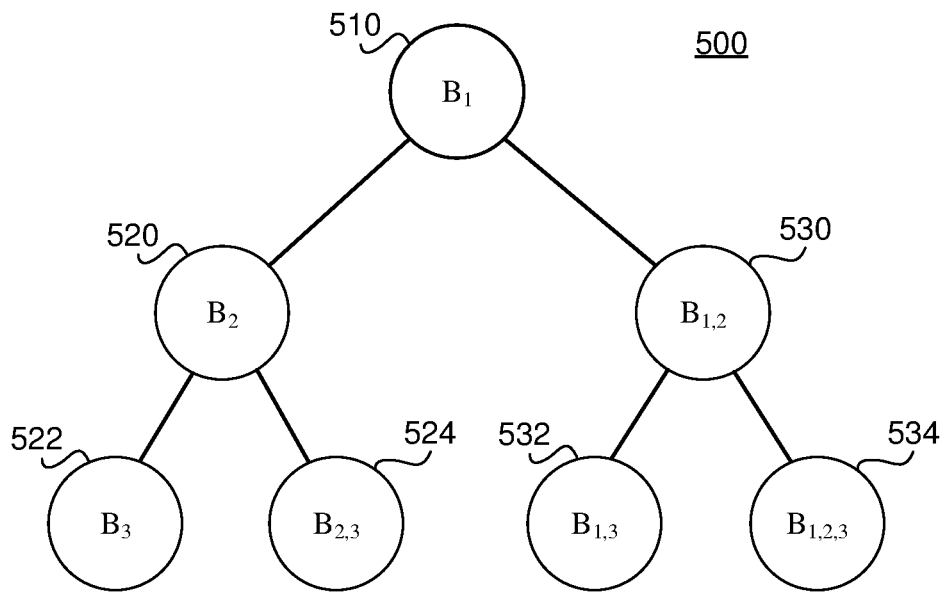
FIG. 5

SCALABLE CODE REPOSITORY WITH GREEN MASTER

CROSS REFERENCE TO RELATED APPLICATIONS

This application claims the benefit of U.S. Provisional Application No. 62/781,581, filed Dec. 18, 2018, which is incorporated by reference.

BACKGROUND

1. Technical Field

The subject matter described relates generally to code repositories and, in particular, to scalable techniques for providing a green master in a code repository.

2. Background Information

Giant monolithic source-code repositories are one of the fundamental pillars of the back-end infrastructure in modern and fast-paced software companies. The sheer volume of everyday code changes creates demand for a reliable and efficient change management system with three properties: a reliably green master, high throughput, and low commit turnaround time. Green refers to the master branch that consistently successfully compiles and passes all build steps, the opposite being red. A broken master (red) may lead to delayed feature rollouts because faulty committed code needs to be detected and rolled back. Additionally, a red master can have a cascaded effect, hampering developer productivity—developers working on a red master may not be able to commit their changes.

SUMMARY

A scalable change management system maintains a green master for a code base. In various embodiments, changes are submitted to a distributed queue from client devices. The code management system uses a probabilistic speculation model to determine likelihoods of changes successfully building and passing tests. A speculation tree includes nodes for possible builds corresponding to different scenarios (meaning which changes in a set succeed or fail). The value of a build can be determined from the probability that it will ultimately be used. The values may be weighted by a metric of the benefit of the corresponding change (e.g., a potential financial impact).

Based on the values of the builds, the change management system determines which builds to implement. For example, for a pair of changes, the build for the first change will always be used. There are two possible outcomes (the first change succeeds or fails) and thus two possible builds for the second change (one based on the state of the code without the first change implemented and one where the first change has been committed). By focusing resources on the scenarios that have the higher values, the overall efficiency of the change management system may be increased.

In one embodiment, the code management system receives changes to the code and maintains an ordered revision queue. A hierarchical set of builds is defined with each build corresponding to a code change. A model is applied to determine a value for each build, with the value being based on the probability that the build will ultimately be used. A build schedule is determined based on the values for the builds and at least some of the builds are implemented to determine whether the corresponding code changes succeed or fail. The code changes that succeed are committed to the code repository. Thus, the available build resources may be efficiently used and a green master may be maintained.

BRIEF DESCRIPTION OF THE DRAWINGS

FIGS. 4A-D illustrate a type of conflict that may arise in a build graph when two changes are applied, according to one embodiment.

FIG. 5 illustrates an example speculation tree, according to one embodiment.

DETAILED DESCRIPTION

The figures and the following description describe certain embodiments by way of illustration. One skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, the elements are similar or identical. Use of the numeral alone in the description that follows may refer to any one or any combination of such elements.

Example Systems

Figure 1:
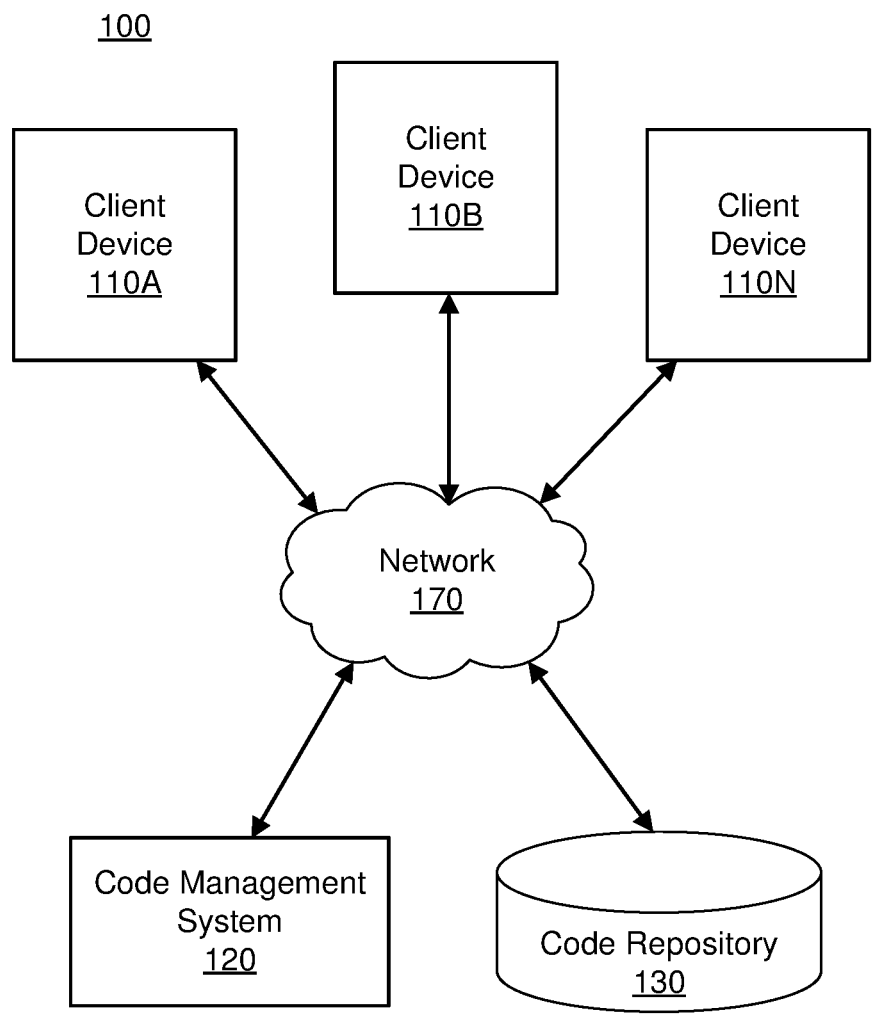
FIG. 1 is a block diagram of a networked computing environment suitable for storing and managing a code repository, according to one embodiment.

FIG. 1 illustrates one embodiment of a networked computing environment 100 suitable for storing and managing a code repository. In the embodiment shown in FIG. 1, the networked computing environment 100 includes client devices 110A-N, a code management system 120, and a code repository 130, all connected via a network 170. Although only three client devices 110 are shown for convenience, in practice, many (e.g., hundreds or even thousands of) client devices 110 may interact with the code repository 130 via the network 170. In other embodiments, the networked computing environment 100 contains different or additional elements. In addition, the functions may be distributed among the elements in a different manner than described.

The client device 110 is a computing device with which software developers may edit code and submit changes to be committed to a master (e.g., in the code repository 130). The master represents the latest copy of the code for one or more applications or other software from which deployment versions are built. When developers are working on modifications or additions to the code, they may operate on a branch copy of the code, with the changes only being added to the master once they have marked as complete, obtained any designated approvals (e.g., from a project manager), and passed any designated tests (e.g., build tests). The client device 110 may be a desktop computer, laptop computer, tablet, smartphone, or any other computing device with which code may be edited and submitted. Various embodiments of the client devices 110 are described in greater detail below, with reference to FIG. 2.

The code management system 120 provides analysis and testing of code changes to provide a green master. A master may be considered green if it can be successfully built and pass any designated tests. If the code management system 120 determines a change will break the code, resulting in a red master, the code management system 120 may prevent the change from being committed or take other corrective action. Various embodiments of the code management system are described in greater detail below, with reference to FIG. 3.

The code repository 130 includes one or more computer-readable media configured to store the master copy of the code. As described previously, in one embodiment, the code management system 120 maintains the master to ensure that it is always green. Alternatively, the code management system 120 may provide a master that has a high probability of being green without guaranteeing it. Such an approach may provide a desirable balance between reducing the amount of time changes take to commit and the costs associated with fixing a broken master. The probability of the master remaining green may vary depending on the cost associated with the master breakage. In some embodiments, the approach used for analysis and testing enables the code management system 120 to scale to code repositories 130 for which there are thousands of changes per day.

The network 170 provides the communication channels via which the other elements of the networked computing environment 100 communicate. The network 170 can include any combination of local area or wide area networks, using both wired or wireless communication systems. In one embodiment, the network 170 uses standard communications technologies or protocols. For example, the network 170 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). In some embodiments, all or some of the communication links of the network 170 may be encrypted using any suitable technique or techniques.

Figure 2:
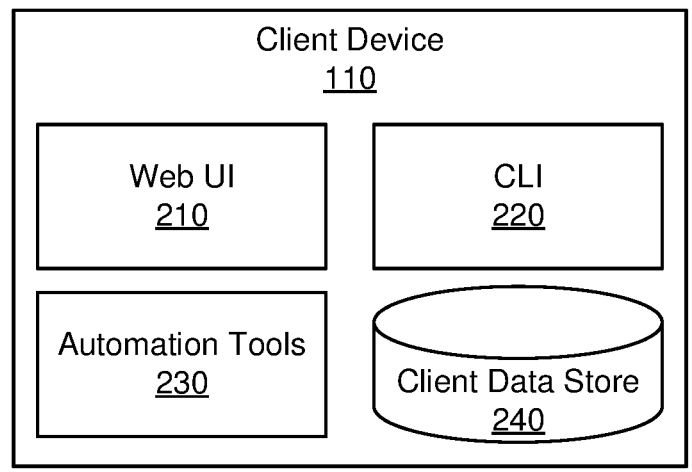
FIG. 2 is a block diagram of one of the client devices of FIG. 1, according to one embodiment.

FIG. 2 illustrates one embodiment of a client devices 110. As noted previously, the client device 110 is a computing device with which a software developer may edit code and submit changes to be committed to a master. In the embodiment shown, the client device 110 includes several mechanisms for submitting code changes to be committed to the master such as, for example: a web user interface (UI) 210, a command line interface (CLI) 220, and automation tools 230. In other embodiments, client devices 110 may include different or additional mechanisms for submitting code changes. For example, one client device might include a web UI 210 while another uses a CLI 220. The client device 110 also includes a data store 240.

The web UI 210 and CLI 220 enable a user to submit changes to the code to be committed to the master using a webpage and text commands, respectively. The automation tools 230 may automatically submit changes to be committed to the master once certain criteria are met. In each case, the code may be provided to one or more reviewers for manual approval before the code management system 120 attempts to commit the change to the master. For example, a developer might submit a patch to their manager for approval using the CLI 220. If the manager approves the patch (e.g., by selecting an "approve" button or other control in the web UI 210), the automation tools 230 may automatically queue the patch for testing and application to the master (assuming the patch passes the testing).

The client data store 240 includes one or more one or more computer-readable media configured to locally store data used by the client device 110. For example, the client data store 240 may store a feature branch. The feature branch is a copy of some or all of the code from the master on which the developer is making changes. Because multiple developers may be submitting changes to the master (potentially at a rate of thousands of changes a day), the feature branch does not necessarily reflect the current master. However, when the developer submits the change to be committed to master, the management system 120 determines whether other changes conflict with the developer's change and, if so, takes appropriate corrective action (e.g., preventing one or both changes from being applied).

Figure 3:
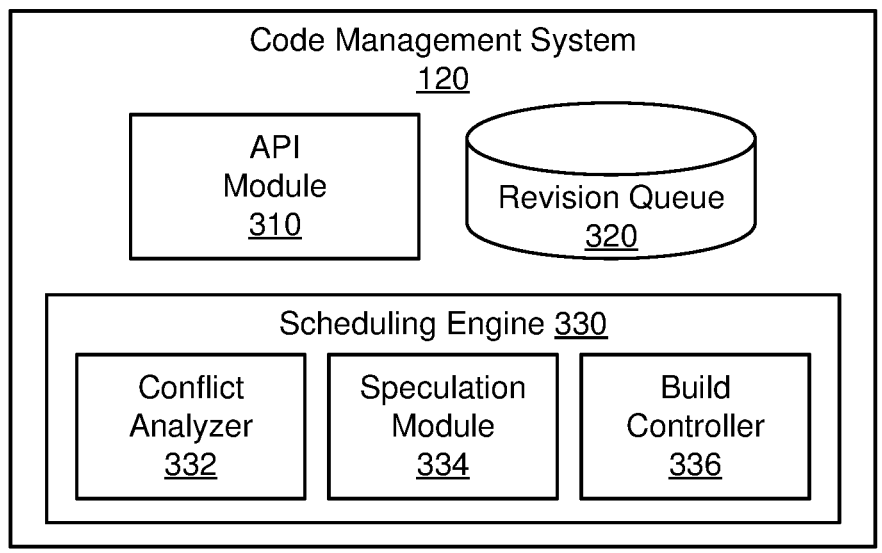
FIG. 3 is a block diagram of the code management system of FIG. 1, according to one embodiment.

FIG. 3 illustrates one embodiment of the code management system 120. In the embodiment shown, the code management system 120 includes an application programming interface (API) module 310, a revision queue 320, and a scheduling engine 330. In other embodiments, the code management system 120 contains different or additional elements. In addition, the functions may be distributed among the elements in a different manner than described.

The API module 310 provides a user interface or user interfaces through which developers submit changes to the code to be committed to the master. The API module 310 may receive changes from one or more of the web UI 210, the CLI 220, or the automation tools 230 of client devices 110. The API module 310 may perform pre-processing on changes, such as validating that the changes come from an authorized user and are in a supported format. After determining a change is valid, the API module 310 may add the change to the revision queue 320.

The revision queue 320 includes one or more computer-readable media configured to store changes to the master that are queued for testing. Although the revision queue 320 is shown as a single entity, it may be a distributed queue. Changes are added to the revision queue 320 according to one or more revision ordering update criteria. In one embodiment, the revision queue 320 is a First-in-first-out (FIFO) queue. In other embodiments, other ordering criteria may be used.

The scheduling engine 330 schedules builds based on determined values of the builds. Each build is for a set of one or more changes from the submit queue. The value of a build may be based on the probability that the build will ultimately be used to commit or reject the corresponding set of changes and one or more metrics of the benefit (e.g., monetary benefit) of the set of changes. In the embodiment shown in FIG. 3, the scheduling engine 330 includes a conflict analyzer 332, a speculation module 334, and a build controller 336. In other embodiments, the scheduling engine 330 contains different or additional elements. In addition, the functions may be distributed among the elements in a different manner than described.

The conflict analyzer 332 analyzes changes in the revision queue to identify those which may potentially conflict. The code may be partitioned into smaller entities called targets. A target is a list of source files and dependencies along with a specification on how these entities can be translated into one or more output files. The output files can further be consumed by other targets, creating more dependencies. In one embodiment, the conflict analyzer 332 builds a data structure identifying the targets and dependencies (e.g., a directed acyclic graph).

Using the data structure, the conflict analyzer may identify one or more independent sets of changes. An independent set in this context is one or more changes that may conflict with each other (because they impact at least one target in common) but do not conflict with changes in any of the other sets. For example, if two changes both update the same class, they have a target in common (the class they both update). The independent subsets are not fixed and can change when new changes enter the system. If a new change enters the system that conflicts with two changes in two different independent subsets, then the two sets are not independent anymore, and are merged into one.

In one embodiment, the conflict analyzer 332 identifies sets of targets that are impacted by changes. The set of targets for a change includes targets that it directly affects and targets that depend (either directly or indirectly) on directly affected targets. The conflict analyzer can detect conflicting changes by calculating a hash value for each target. The hash value for a target may be calculated by finding all of the target's transitive dependencies and hashing their attributes along with the files that the target references. The target hashes can be used to detect which targets are affected when source files or build files change. Thus, the conflict analyzer can detect if two changes potentially conflict with each other or not based on the affected targets. If the lists of targets affected by two changes intersect then the changes conflict because there is at least one target that is affected by both changes. However, two changes might still conflict with each other, even if there is no intersection between the determined affected targets. FIGS. 4A-D illustrate a scenario where this is the case.

FIG. 4A illustrates an initial example build graph for three targets. The build graph represents the dependencies between targets for the current master. In particular, target A 410 depends on target B 420, while target C 430 is independent. For each target, the conflict analyzer 332 may calculate a hash value.

In FIG. 4B, the conflict analyzer 332 has determined the results of independently applying a first change to the master. In particular, target A 412 and target B 422 have changed. Consequently, the hash values for target A 412 and target B 422 also change. However, the dependencies have not been altered by the first change.

In FIG. 4C, the conflict analyzer 332 has determined the results of independently applying a second change to the master. In particular, target C 432 and its hash value have changed. In addition, target C 432 now depends on target B 420. However, at this point, no conflict is detected. While target C 432 has a new dependency, the application of the second change alone does not change target B 420, so a conflict is not indicated.

However, in FIG. 4D, the conflict is apparent. When the first and second changes are both applied to the master, target C 434 gain a dependency on target B 422 from the second change, and target B 422 is modified by the first change. Therefore, the result of applying the second change is potentially impacted by whether the first change succeeds or fails (depending on whether the changes to target B 422 impact the operation of target C 434).

In one embodiment, the conflict analyzer 322 addresses this by checking whether the list of targets affected by applying all of the changes in a set is the same as the union of targets affected by each individual change in the set. Using this approach to determine whether two changes conflict involves building the target graph four times. More generally, for N changes, the build graphs are computed $4 \times N(N-1)/2$ times.

As it may take several minutes to compute the build graph for a marge master (e.g., with millions of lines of code), some embodiments use one or more optimizations to reduce the number of times the build graph is built. One optimization is to cache the results of computing the build graph for changes. Another optimization is to compute the full build graph only if it will be altered by the application of a change. The conflict analyzer 322 may hash the structure of the build graph (excluding the content of the files) to get a topology hash, avoiding a time-consuming portion of the operation. If the topology hash remains the same before and after application of a change, this indicates the build graph is not modified by the change and conflict analyzer 322 can determine whether two changes conflict based on whether the affected targets overlap without recomputing the build graph.

Regardless of the approach used to track potential conflicts, changes that do not conflict with each other may be built, tested, and committed to the master in parallel without the risk of a failure of one causing the other to fail. In this case, if may be more efficient to build the non-conflicting changes in parallel rather than devote computational resources to determining which build has a higher value.

Referring again to FIG. 3, the speculation module 334 applies a model to assign a value to each build. The value is based on which build paths are the most likely to be traversed in practice. For example, if the determined probability of a first change failing to build or pass tests is only 1%, it is unlikely that any scenario in which the first change fails will occur in practice, and the analysis performed by the code management system 120 can focus on scenarios where the first change is successfully built, tested, and committed to the master. The value may also be based on one or metrics of the benefit (e.g., financial benefit or impact) of the build. Alternatively, benefit quotas may be assigned to development teams and each team may assign a benefit value to changes it generates (within the limitations of its quota).

In various embodiments, the speculation module 334 applies a machine-learned model (e.g., trained using logistic regression) to determine the probability that each change will fail in each possible scenario with regard to previous changes that potentially conflict with it in the queue. For example, for two changes that potentially conflict, the model may determine the probability of the first change failing, the probability of the second change failing if the first change succeeds, and the probability of the second change failing if the first change fails. In one such embodiment, the features used by the model to predict the probability of success for a change include the number of lines of code, the author, the number of commits made, the status of builds, and the various states that a change has undergone. Thus, the speculation module 334 may generate a speculation tree of possible outcomes along with the probability that each node in the tree will be ultimately used to determine whether a change succeeds or fails. In some embodiments, a value of each outcome may be calculated by weighting the probabilities with a metric of the benefit of the corresponding changes to the code as a whole.

FIG. 5 illustrates an example speculation tree 500 generated for a set of three changes, according to one embodiment. For simplicity, in describing the speculation tree 500, the value of each build is assumed to be the probability that the build will ultimately be used (in other words, that the benefit of each build is the same). The speculation tree 500 is a data structure defining a hierarchical set of builds corresponding to different scenarios in which specific changes succeed or fail. The speculation tree 500 has a root node 510 corresponding to a first build, $B_1$, which corresponds to the build steps taken to commit a first change to the master. As all paths through the speculation tree 500 pass through the root node 500, $B_1$ is always used and has a probability of one.

The speculation module 534 generates probabilities for whether node 520 or 530 will be used. Node 520 corresponds to build $B_2$, which determines if a second change can be safely committed to the master in the scenario where the first change failed. Conversely, node 530 corresponds to build $B_{1,2}$, which determines if a second change can be safely committed to the master in the scenario where the first change is successfully committed. Thus, the probabilities of nodes 520 and 530 being used are the probabilities that the first change ($B_1$) fails or succeeds, respectively. The generated probabilities may be used to prioritize one of builds $B_2$ and $B_{1,2}$ over the other, as described in greater detail below with reference to the build controller 336.

The speculation module 534 also determines the probabilities that nodes 522, 524, 532, and 534 will be used. Node 522 corresponds to build $B_3$, which determines if a third change can be safely committed if the first and second changes both fail. Node 524 corresponds to build $B_{2,3}$, which determines if the third change can be safely committed if the first change fails but the second change succeeds. The probabilities for nodes 522 and 524 can be determined by combining the probability of $B_1$ failing with the probabilities of $B_2$ failing and succeeding, respectively.

Node 532 corresponds to build $B_{1,3}$, which determines if the third change can be safely committed if the first change succeeds but the second change fails. Node 534 corresponds to build $B_{1,2,3}$, which determines if the third change can be safely committed if the first and second changes both succeed. The probabilities for nodes 532 and 534 can be determined by combining the probability of $B_1$ succeeding with the probabilities of $B_{1,2}$ failing and succeeding, respectively. Note that $B_{1,2}$ may fail for either of two reasons. The second change may independently fail (e.g., because of a compilation error, unit test failure, or UI test failure) or it may fail because it conflicts with the first change. Thus, the probability of $B_{1,2}$ may be calculated as the probability of the second change independently succeeding less the probability of the second change failing due to a conflict with the first change.

Referring again to FIG. 3, the build controller 336 schedules building and testing of the changes according to the probabilities (or values) generated by the speculation module 334 for the speculation tree 500. In various embodiments, the build controller 336 schedules building and testing of the changes assuming the most likely scenario (as indicated by the output from the speculation module 334) will occur. Thus, when building and testing of a first change is complete, work on the build for the next change may already be underway or completed. Consequently, on average, the building and testing is conducted more efficiently because resources are not wasted on the scenarios that are unlikely to occur.

In one embodiment, the build controller 336 determines a number of scenarios, N, that may be built or tested simultaneously at the current time based on the availability of worker nodes. The build controller then selects N scenarios to build and test based on the probabilities or values (e.g., the N most probable or valuable scenarios). Thus, resources may be used to build and test less likely scenarios when they are available (and would otherwise go unused or underused), further increasing the efficiency of the code management system 120. In some embodiments, a build will not be scheduled unless the corresponding probability or value exceeds a threshold.

Once building/testing for a change is complete, the code management system 120 then knows either that scenarios where the change fails will not occur (if the change built successfully and passed any tests applied) or that scenarios where the change succeeds will not occur (if the change failed to build or failed a test). Thus, any changes currently being built or tested that correspond to scenarios that will not occur can be halted, freeing up the corresponding resources. The process of speculating to determine probabilities for different changes and scheduling a set of builds/tests may then be repeated.

In one embodiment, a user may group two or more changes together to form a stack of changes. Although the changes in the stack are built individually, if any one of the stacked changes fails, none of the changes in the stack are committed to the master. This may allow users to avoid squashing large updates to the code into a single change. This may assist in change tracking and debugging because which changes in the stack succeed and fail can be monitored. Furthermore, because the changes are built individually, the code management system 120 can check that intermediate changes do not cause a master breakage. For example, the second of three stacked changes might cause a master breakage that will later be fixed by the third change. Even though the breakage may ultimately be fixed by the third change, the period between implementation of the second and third changes may be unacceptably long. Processing the stacked changes such that all commit or all fail may avoid this problem.

Example Methods

Figure 6:
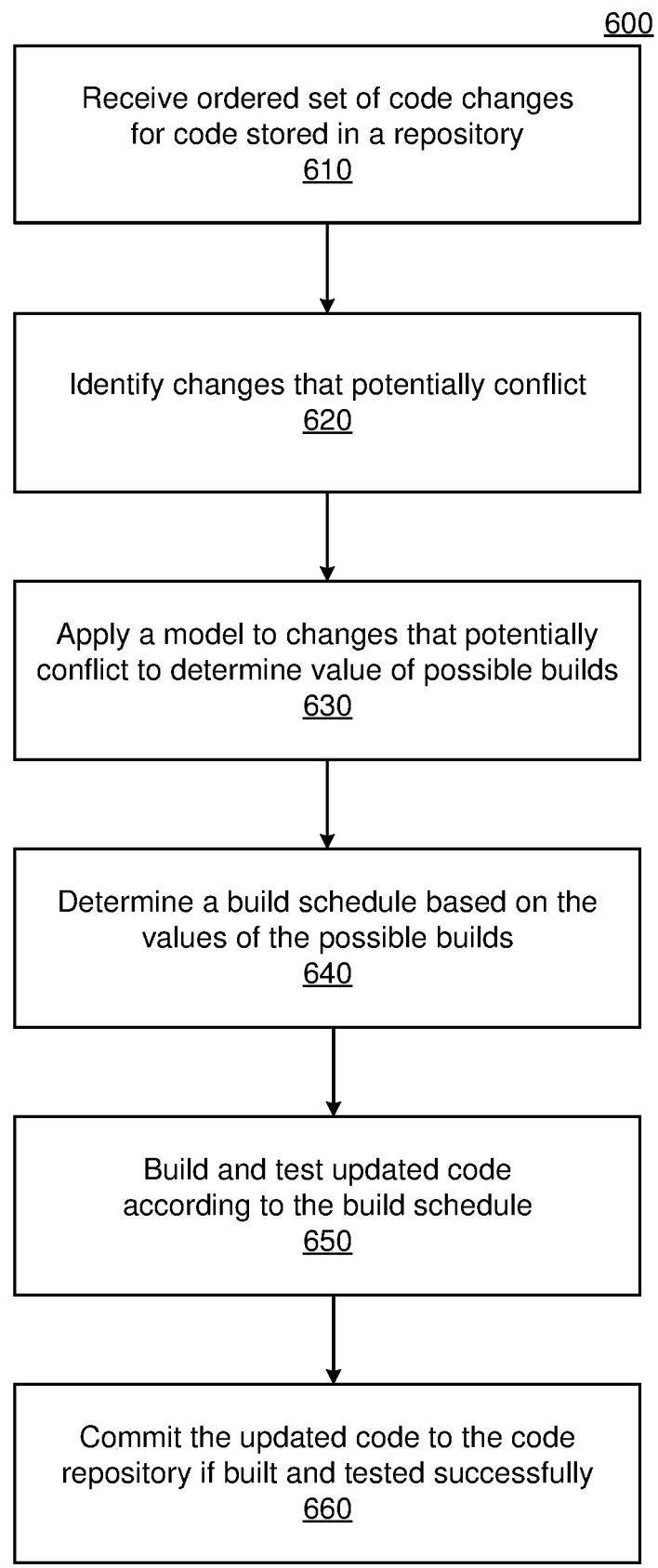
FIG. 6 is a flowchart illustrating a method for maintaining a green master in a code repository at scale, according to one embodiment, according to one embodiment.

FIG. 6 illustrates a method 600 for maintaining a green master in a code repository at scale, according to one embodiment. The steps of FIG. 6 are illustrated from the perspective of the code management system 120 performing the method 600. However, some or all of the steps may be performed by other entities or components. In addition, some embodiments may perform the steps in parallel, perform the steps in different orders, or perform different steps.

In the embodiment shown in FIG. 6, the method 600 begins with the API module 310 receiving 610 an ordered set of code changes for code stored in a repository (e.g., the code repository 130). The conflict analyzer 332 identifies 620 changes that potentially conflict. As described previously, in one embodiment, the conflict analyzer 332 builds a directed acyclic graph that indicates which changes potentially conflict and, thus, which changes cannot (or are highly unlikely to) impact each other due to having no common modification targets in the code.

The speculation module 334 applies 630 a model to changes that potentially conflict to determine a value for each change. In one embodiment, the value is calculated as the product of a measure of the benefit provided by the change and a probability that the corresponding scenario (e.g., the preceding combination of change successes and failures) will occur. In another embodiment, the values may be the probabilities of the scenarios without consideration of the benefit associated with each change. The model may be a logistic regression model or any other appropriate type of model that may be trained to calculate probabilities that changes will succeed or fail during building/testing.

The build controller 336 determines 640 a build schedule based on the values generated by the speculation module 334. As described previously, in one embodiment, the build controller 336 determines the number of scenarios it can currently build and test based on the currently available resources and begins building and testing 650 that number of scenarios (e.g., the most likely or highest value scenarios). If the changes result in updated code that can be built successfully and pass testing, the updated code is committed 660 to the master. In other words, if the updated code will not (or is unlikely to) break the master, the master is updated.

Computing System Architecture

Figure 7:
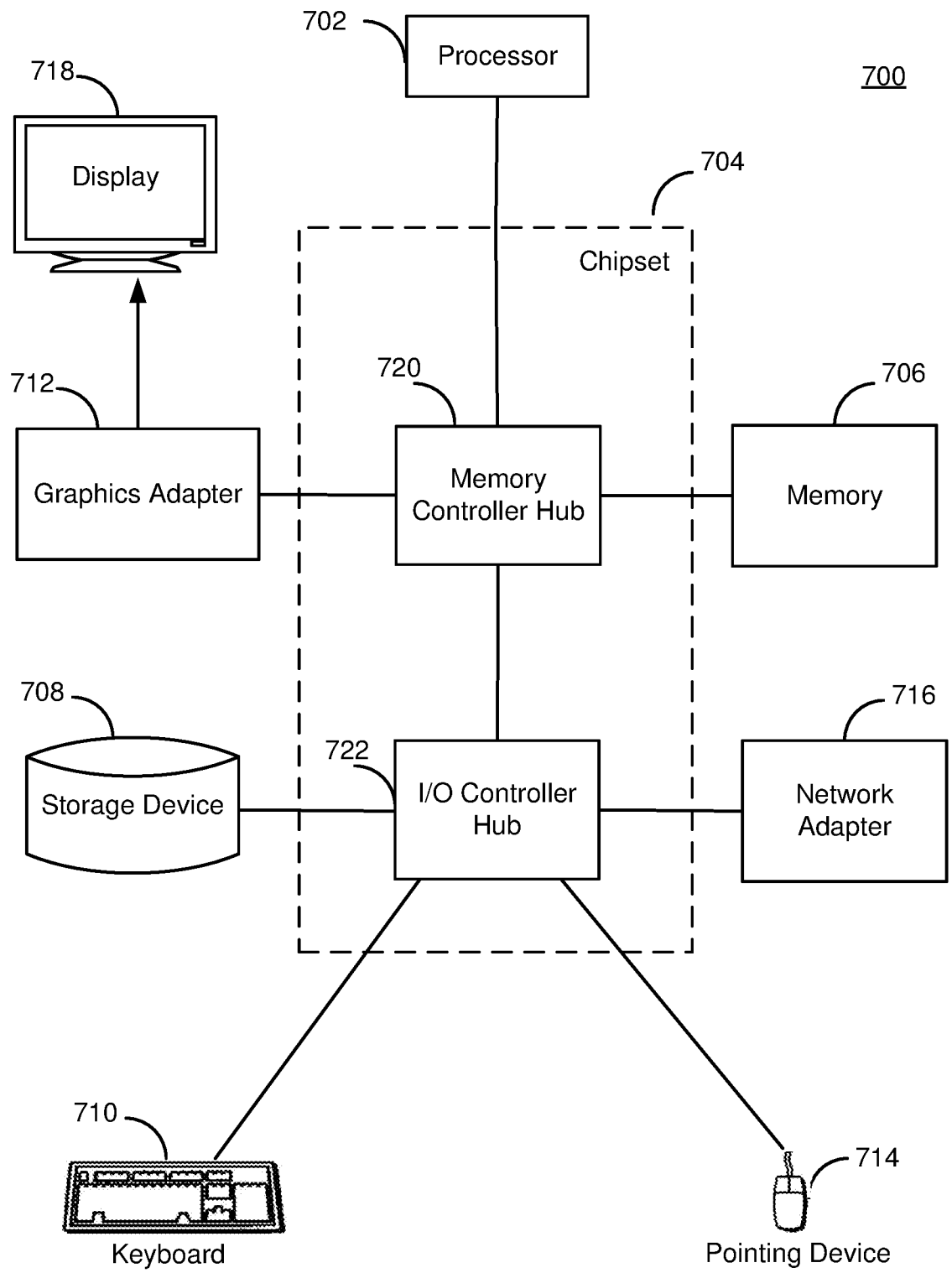
FIG. 7 is a block diagram illustrating an example of a computer suitable for use in the networked computing environment of FIG. 1, according to one embodiment.

FIG. 7 is a block diagram illustrating an example computer 700 suitable for use as a client device 110, code management system 120, or code repository 130. The example computer 700 includes at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, keyboard 710, pointing device 714, and network adapter 716 are coupled to the I/O controller hub 722. Other embodiments of the computer 700 have different architectures.

In the embodiment shown in FIG. 7, the storage device 708 is a non-transitory computer-readable storage medium such as a hard drive, compact disk read-only memory (CD-ROM), DVD, or a solid-state memory device. The memory 706 holds instructions and data used by the processor 702. The pointing device 714 is a mouse, track ball, touch-screen, or other type of pointing device, and is used in combination with the keyboard 710 (which may be an on-screen keyboard) to input data into the computer system 700. The graphics adapter 712 displays images and other information on the display 718. The network adapter 716 couples the computer system 700 to one or more computer networks.

The types of computers used by the entities of FIG. 1 can vary depending upon the embodiment and the processing power required by the entity. For example, the code repository 130 might include a distributed database system comprising multiple servers working together to provide the functionality described. Furthermore, the computers can lack some of the components described above, such as keyboards 710, graphics adapters 712, and displays 718.

Additional Considerations

Some portions of above description describe the embodiments in terms of algorithmic processes or operations. These algorithmic descriptions and representations are commonly used by those skilled in the software arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. The use of "a" or "an" should be construed as "one or more" unless the context provides a clear indication to the contrary.

Upon reading this disclosure, those of skill in the art will appreciate still additional alternative structural and functional designs for a system and a process for providing a reliably green master in a code repository. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

What is claimed is:

1. A method of maintaining a green master in a code repository, the method comprising:
    receiving an ordered set of code changes for code stored in the code repository, the ordered set of code changes including a first change and a second change;
    defining a hierarchical set of builds, the hierarchical set of builds including:
        a first build corresponding to the first change;
        a second build corresponding to the second change in a first scenario where the first change fails; and
        a third build corresponding to the second change in a second scenario where the first change succeeds;
    applying a model to determine a value for each build of the hierarchical set of builds, the values for the second and third builds respectively based on probabilities of the first and second scenarios;
    determining a build schedule based on the values for the builds;
    implementing at least some of the builds, according to the build schedule, to determine whether the corresponding code changes succeed or fail; and
    committing one or more code changes that succeed to the code repository.

2. The method of claim 1, wherein the ordered set of code changes further includes a third change, and the hierarchical set of builds further includes:
    a fourth build corresponding to the third change in a third scenario where the first and second changes both fail;

a fifth build corresponding to the third change in a fourth scenario where the first change fails and the second change succeeds;

a sixth build corresponding to the third change in a fifth scenario where the first change succeeds and the second change fails; and a seventh build corresponding to the third change in a sixth scenario where the first and second changes both succeed.

3. The method of claim 2, wherein the value for the fourth build is based on a probability of the third scenario, the value for the fifth build is based on a probability of the fourth scenario, the value for the sixth build is based on a probability of the fifth scenario, and the value for the seventh build is based on a probability of the fifth scenario.

4. The method of claim 1, wherein defining the hierarchical set of builds comprises:
   identifying a set of changes that potentially conflict from among the ordered set of changes; and
   defining the hierarchical set of builds using the set of changes that potentially conflict.

5. The method of claim 4, further comprising:
   identifying an additional change from among the ordered set of changes that does not conflict with the set of changes that potentially conflict;
   implementing, in parallel with a build corresponding to a change in the set of changes that potentially conflict, a build to determine whether the additional code change succeeds or fails; and
   committing the additional code change to the code repository if the code change succeeds.

6. The method of claim 1, wherein the value for each build is based on a probability that the corresponding build will be used to determine whether the corresponding change succeeds or fails.

7. The method of claim 6, wherein the value for each build is further based on benefits associated with the corresponding change.

8. The method of claim 1, wherein determining the build schedule comprises:
   determining a number of builds that can be implemented in parallel;
   selecting the determined number of builds based on the values of the builds; and
   scheduling the selected builds to be implemented in parallel.

9. The method of claim 8, further comprising:
   determining the change corresponding to a selected build fails;
   identifying one or more selected builds that correspond to scenarios reliant on the change corresponding to the selected build succeeding; and
   stopping the one or more selected builds.

10. A non-transitory computer-readable medium storing computer program code for maintaining a green master in a code repository, the computer program code, when executed by one or more processors, causing the one or more processors to perform operations comprising:
    receiving an ordered set of code changes for code stored in the code repository, the ordered set of code changes including a first change and a second change;
    defining a hierarchical set of builds, the hierarchical set of builds including:
       a first build corresponding to the first change;
       a second build corresponding to the second change in a first scenario where the first change fails; and
       a third build corresponding to the second change in a second scenario where the first change succeeds;
    applying a model to determine a value for each build of the hierarchical set of builds, the values for the second and third builds respectively based on probabilities of the first and second scenarios;
    determining a build schedule based on the values for the builds;
    implementing at least some of the builds, according to the build schedule, to determine whether the corresponding code changes succeed or fail; and
    committing one or more code changes that succeed to the code repository.

11. The non-transitory computer-readable medium of claim 10, wherein the ordered set of code changes further includes a third change, and the hierarchical set of builds further includes:
    a fourth build corresponding to the third change in a third scenario where the first and second changes both fail;
    a fifth build corresponding to the third change in a fourth scenario where the first change fails and the second change succeeds;
    a sixth build corresponding to the third change in a fifth scenario where the first change succeeds and the second change fails; and
    a seventh build corresponding to the third change in a sixth scenario where the first and second changes both succeed.

12. The non-transitory computer-readable storage medium of claim 11, wherein the value for the fourth build is based on a probability of the third scenario, the value for the fifth build is based on a probability of the fourth scenario, the value for the sixth build is based on a probability of the fifth scenario, and the value for the seventh build is based on a probability of the fifth scenario.

13. The non-transitory computer-readable medium of claim 10, wherein defining the hierarchical set of builds comprises:
    identifying a set of changes that potentially conflict from among the ordered set of changes; and
    defining the hierarchical set of builds using the set of changes that potentially conflict.

14. The non-transitory computer-readable medium of claim 13, wherein the operations further comprise:
    identifying an additional change from among the ordered set of changes that does not conflict with the set of changes that potentially conflict;
    implementing, in parallel with a build corresponding to a change in the set of changes that potentially conflict, a build to determine whether the additional code change succeeds or fails; and
    committing the additional code change to the code repository if the code change succeeds.

15. The non-transitory computer-readable medium of claim 10, wherein the value for each build is based on a probability that the corresponding build will be used to determine whether the corresponding change succeeds or fails.

16. The non-transitory computer-readable medium of claim 15, wherein the value for each build is further based on benefits associated with the corresponding change.

17. The non-transitory computer-readable medium of claim 10, wherein determining the build schedule comprises:
    determining a number of builds that can be implemented in parallel;

selecting the determined number of builds based on the values of the builds; and scheduling the selected builds to be implemented in parallel.

18. The non-transitory computer-readable medium of claim 17, wherein the operations further comprise:

determining the change corresponding to a selected build fails;

identifying one or more selected builds that correspond to scenarios reliant on the change corresponding to the selected build succeeding; and stopping the one or more selected builds.

19. A networked computing environment for maintaining a green master, the networked computing environment comprising:

a code repository configured to store code;

a plurality of client devices configured to provide a user interface for generating an ordered set of code changes to the code in the code repository and submit the ordered set of code changes to a revision queue, the ordered set of code changes including a first change and a second change; and a code management system, communicatively coupled to the revision queue, configured to:

define a hierarchical set of builds, each build corresponding to a code change of the ordered set of code changes, the hierarchical set of builds including:

a first build corresponding to the first change;

a second build corresponding to the second change in a first scenario where the first change fails; and a third build corresponding to the second change in a second scenario where the first change succeeds;

apply a model to determine a value for each build of the hierarchical set of builds, the values for the second and third builds respectively based on probabilities of the first and second scenarios;

determine a build schedule based on the values for the builds;

implement at least some of the builds, according to the build schedule, to determine whether the corresponding code changes succeed or fail; and commit one or more code changes that succeed to the code repository.

20. The networked computing environment of claim 19, wherein in order to define the hierarchical set of builds the code management system is further configured to:

identify a set of changes that potentially conflict from among the ordered set of changes; and define the hierarchical set of builds using the set of changes that potentially conflict.

* * * * *